May 19, 1959 J. A. MILLER 2,886,983
TRANSMISSION
Filed May 16, 1955 3 Sheets-Sheet 1

Inventor:
James A. Miller
By:
Keith J. Blews Atty.

May 19, 1959    J. A. MILLER    2,886,983
TRANSMISSION
Filed May 16, 1955    3 Sheets-Sheet 2

Inventor:
James A. Miller
By:
Keith J. Blew Atty.

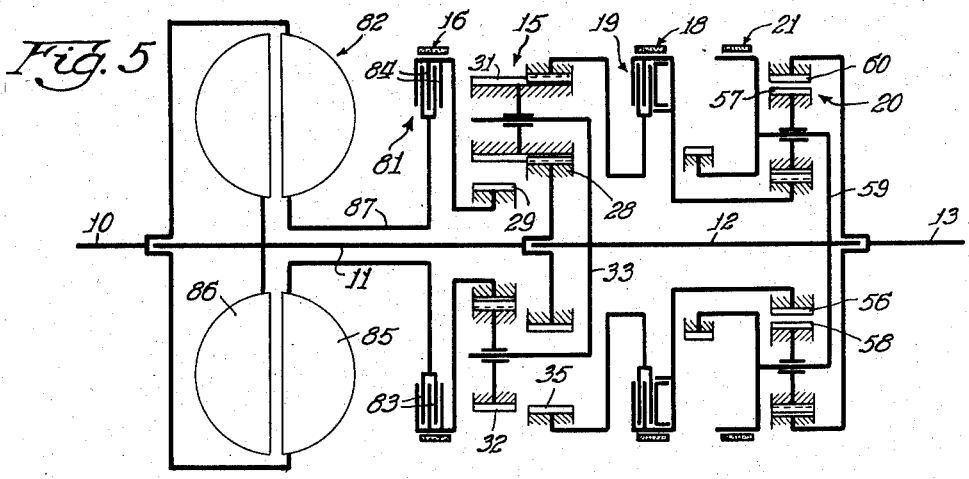
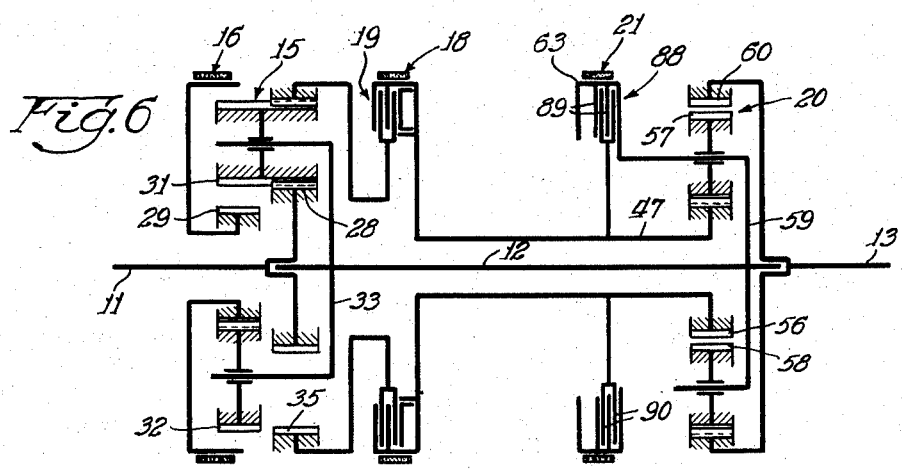

United States Patent Office 2,886,983
Patented May 19, 1959

2,886,983

TRANSMISSION

James A. Miller, Jackson, Mich., assignor to Borg-Warner Corporation, Chicago, Ill., a corporation of Illinois Application May 16, 1955, Serial No. 508,339

10 Claims. (Cl. 74—759)

My invention relates to transmissions for automotive vehicles and in particular to transmissions for use in heavy vehicles such as trucks.

It is an object of my invention to provide an improved transmission of simple and rugged construction having a minimum number of gears and engaging mechanisms, such as clutches and brakes, and yet providing at least four speeds in forward drive and a drive in reverse.

It is also an object of the invention to provide an improved transmission in which the changing between successive forward drive speed ratios is obtained by disengaging a friction brake and simultaneously engaging a friction clutch or vice versa, thus making a smooth transition between ratios. It is contemplated that the transmission may advantageously be used in series relationship with a hydraulic torque converter or that it may be used in connection with a fluid coupling or hydraulic torque converter in such a way that the power from the vehicle engine is split, only part of it in certain speed ratio drives passing through the hydraulic torque converter or fluid coupling, thus providing greater efficiency.

The invention consists of the novel constructions, arrangements and devices to be hereinafter described and claimed for carrying out the above-stated objects, and such other objects as will be apparent from the following description of preferred forms of the invention, illustrated with reference to the accompanying drawings, in which:

Figure 1:
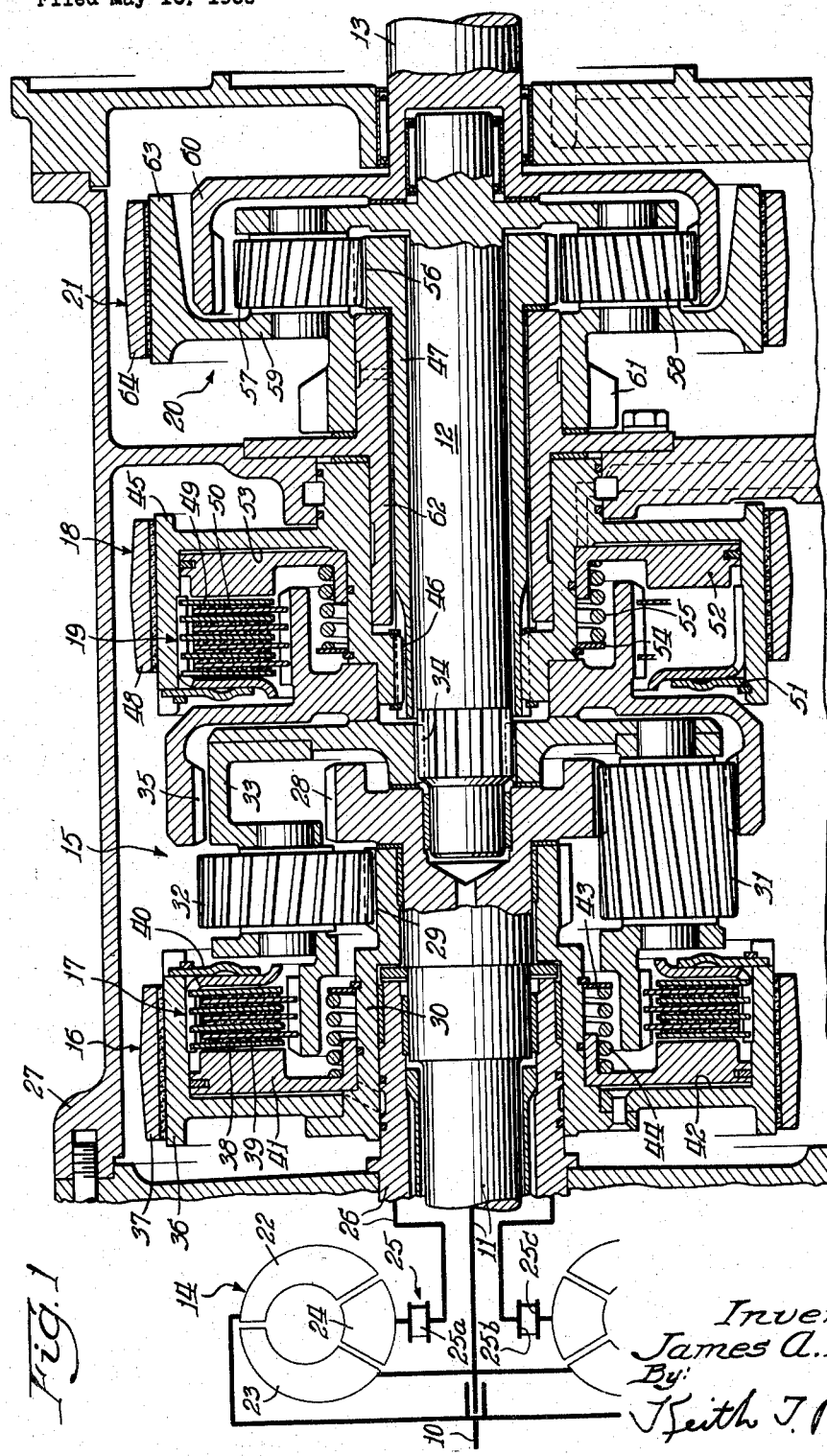
Fig. 1 is a longitudinal sectional view of a transmission constructed in accordance with the principles of the invention and comprising gearing connected in tandem with a hydraulic torque converter.
Figure 2:
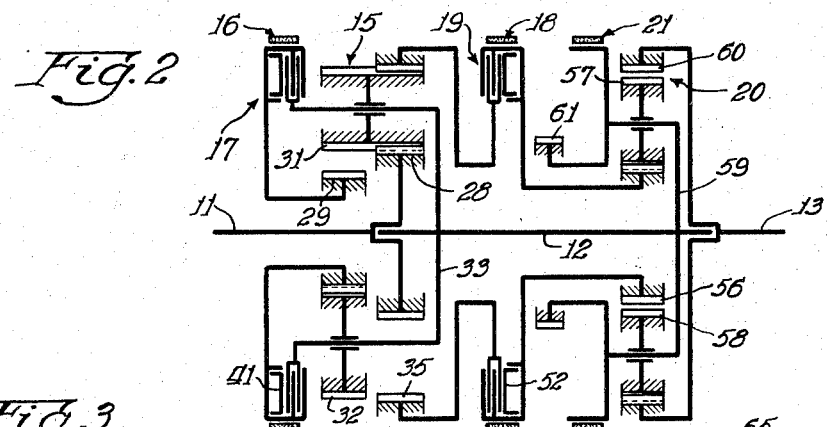
Fig. 2 is a schematic illustration of the gearing portion of the transmission shown in Fig. 1 located behind the hydraulic torque converter.

Fig. 5 is a schematic illustration of a modified form of the transmission illustrated in Fig. 1 which has a fluid coupling in lieu of a hydraulic torque converter and which is so constructed that the fluid coupling may be by-passed with at least a portion of the power from the drive shaft; and Fig. 6 is a schematic illustration, similar to Fig. 2, of the portion of the transmission behind the torque converter and which constitutes a modification of the transmission as shown in Figs. 1 and 2.

Like characters of reference designate like parts in the several views.

Referring now in particular to Figures 1 and 2, the illustrated transmission comprises an input or drive shaft 10, an intermediate shaft 11, a second intermediate shaft 12 and a driven or output shaft 13. The shafts are arranged coaxially, and the input shaft 10 is adapted to be driven by the vehicle engine (not shown), while the output shaft 13 is arranged, through suitable means, to drive the driven wheels of the vehicle (not shown). The transmission includes a torque converter, generally indicated at 14, a first double pinion planetary gear set 15, a friction brake 16, a friction clutch 17, a friction brake 18, a friction brake 19, a second double pinion planetary gear set 20, and a friction brake 21.

The hydraulic torque converter 14 comprises a bladed impeller element 22 connected to be driven by the input shaft 10, a bladed turbine element 23 fixed with respect to the intermediate shaft 11, and a bladed stator element 24. The torque converter is constructed in accordance with well-known practice, with the blades of the elements 22, 23 and 24 disposed in a common fluid circuit, so that when the impeller element 22 is driven, the turbine element 23 is driven by means of the fluid which is circulated by rotation of the impeller element, and the stator element 24 functions to change the direction of flow of the fluid, so that the turbine element is driven at a greater torque than is impressed on the impeller element 22.

A one-way free-wheeling brake 25 of well-known construction is provided between the stator element 24 and a sleeve extension 26 of the transmission housing 27. The brake 25 may comprise a plurality of tiltable sprags 25a adapted to wedge between inner and outer cylindrical race surfaces 25b and 25c. The brake 25 is so arranged to prevent a rotation of the stator element 24 in a direction which is reverse to that of the drive shaft 10.

As is well-known with converters of this type, when the rotation of the turbine element increases to a certain speed, the reaction of the fluid on the stator element reverses, thus tending to rotate the stator element in the forward direction, and the one-way brake releases. Thereafter, the unit 14 functions as a simple fluid coupling driving the turbine element 23 at no increase in torque.

The double pinion planet gear set 15 comprises a sun gear 28 formed on the shaft 11, a sun gear 29 formed on a sleeve 30 mounted concentrically to and for relative rotation with respect to the shaft 11, meshing long and short planet gears 31 and 32, a planet carrier 33 rotatably mounting the planet gears and splined at 34 to the shaft 12, and a ring gear 35. The long planet gears 31 mesh with the sun gear 28 and the ring gear 35, and the short planet gears 32 mesh with the sun gear 29.

The friction brake 16 comprises a hollow drum 36 fixed to the sleeve 30 and a flexible brake band 37, adapted to be contracted into frictional engagement on the drum 36 by suitable means, such as a fluid operated servo-motor (not shown).

The friction clutch 17 comprises a plurality of clutch plates 38 and a plurality of interleaved friction places 39, each friction plate being provided with suitable friction facings. The clutch plates 38 are splined to the interior of the hollow drum 36, and the friction discs 39 are splined to the planet carrier 33 of the planet gear set 15. A backing plate 40 is fixed within the drum 36, and an annular piston 41 is slidably disposed within the drum cavity 42 on the other side of the discs 38 and 39. The piston 41 functions to pack the discs 38 and 39 together in frictional engagement between the piston 41 and the backing plate 40 when fluid pressure is supplied to the cavity 42. A spring retainer 43 is fixed to the sleeve 30 and a coil spring 44 is disposed between the piston 41 and the retainer 43 for resiliently holding the piston 41 in its clutch disengaging position when fluid under pressure is no longer supplied to the cavity 42.

The friction brake 18 comprises a hollow brake drum 45 splined at 46 to a sleeve shaft 47 which is mounted concentrically to and for relative rotation with respect to the shaft 12, and a flexible brake band 48 adapted to be frictionally engaged on the brake drum 45 by suitable well-known means such as a fluid operated servo-motor.

The friction clutch 19 comprises a plurality of clutch plates 49 and a plurality of interleaved friction plates 50, each friction plate being provided with suitable friction facings. The clutch plates 49 are splined within the drum 45, and the friction plates 50 are splined to the ring gear 35 of the planetary gear set 15. A backing plate 51 is fixed within the drum 45, and an annular piston 52 is slidably disposed within a cavity 53 formed in the drum 45 on the other side of the discs 49 and 50. The piston 52 functions to pack the discs 49 and 50 together in frictional engagement between the piston 52 and the backing plate 51 when fluid pressure is supplied to the cavity 53. A spring retainer 54 is fixed to the drum 45, and a coil spring 55 is disposed between the piston 52 and the retainer 54 for resiliently holding the piston 52 in its clutch disengaging position when fluid under pressure is no longer supplied to the cavity 53.

The double pinion planetary gear set 20 comprises a sun gear 56 formed on the sleeve 47, meshing planet gears 57 and 58 rotatably carried by a planet carrier 59 and a ring gear 60 fixed with respect to the output shaft 13. The planet gears 57 also mesh with the sun gear 56, and the planet gears 58 also mesh with the ring gear 60. A power take-off gear 61 is formed, as an extension of the planet carrier 59, and is relatively rotatable with respect to a sleeve portion 62 of the transmission housing 27.

The friction brake 21 comprises a brake drum 63 formed on the planet carrier 59 of the planet gear set 20 and a flexible brake band 64 adapted to be frictionally engaged on the drum 63 by means of a suitable operating mechanism, such as a fluid operated servo-motor (not shown).

The transmission provides four forward drive ratios and a drive in reverse. In all of these drives, the shaft 10 is driven by the vehicle engine, and rotation will be transmitted to the shaft 11 by means of the torque converter 14.

In neutral condition of the transmission, the friction brakes and clutches are all disengaged, and there is no power flow through the transmission.

First speed forward drive is completed by engaging the friction clutch 19 and the friction brake 18. The friction clutch 19 connects the ring gear 35 of the planet gear set 15 and the sun gear 56 of the planet gear set 20 together, and the friction brake 18 holds the ring gear 35 and the sun gear 56 against rotation, so that the ring gear 35 constitutes a reaction element for the planet gear set 15 and the sun gear 56 constitutes a reaction element for the planet gear set 20. The power flows through the shaft 11, the sun gear 28, the planet gears 31, the planet carrier 33, the shaft 12, the planet carrier 59, the planet gears 57 and 58 and the ring gear 60 to the output shaft 13. The ring gear 60 and the output shaft 13 will rotate in the forward direction at a speed which is much reduced to that of the shaft 11. In this drive, the gear set 15 and the gear set 20 each provide a reduction in speed and a multiplication in torque, and these two gear sets in this drive are effectively connected in tandem so that the overall torque multiplication between the shafts 11 and 12 is the product of the torque multiplications produced by the individual gear sets 15 and 20.

To complete the second speed forward drive, the friction clutch 19 is disengaged and the friction brake 16 is engaged, the friction brake 18 remaining engaged. The friction brake 16 holds the sun gear 29 against rotation, so that the sun gear 29 functions as a reaction element for the planet gear set 15; and the friction brake 18 holds the sun gear 56 of the planet gear set 20 against rotation, so that the sun gear 56 acts as a reaction element for the planet gear set 20. The power flow is through the shaft 11, the sun gear 28, the planet gears 31 and 32, the planet carrier 33, the shaft 12, the planet carrier 59, the planet gears 57 and 58 and the ring gear 60 to the output shaft 13. The ring gear 60 and the output shaft 13 will rotate in the forward direction at a speed which is reduced to that of the shaft 11 but which is higher than that of the shaft 13 in the first speed forward drive. The gear set 20 functions the same as in low speed drive, producting the same speed ratio and torque multiplication. The gear set 15 produces a higher speed ratio for second speed drive than for first speed drive, since for second speed drive the sun gear 29 is the reaction element instead of the ring gear 35.

To complete the third speed forward drive, the brake 16 is disengaged and the clutch 17 is engaged, with the brake 18 remaining in engagement. The clutch 17 connects the planet carrier 33 and the sun gear 29 of the planet gear set 15 together, and the friction brake 18 holds the sun gear 56 of the planet gear set 20 against rotation, so that the sun gear 56 acts as a reaction element for the planet gear set 20. The power flow is through the shaft 11, the sun gear 28, the planet gears 31 and 32, the planet carrier 33, the shaft 12, the planet carrier 59, the planet gears 57 and 58 and the ring gear 60 to the output shaft 13. The ring gear 60 and the output shaft 13 rotate in the forward direction at a speed which is reduced to that of the shaft 11 but which is higher than that of the shaft 13 in the first and second speeds forward drive. In third speed drive, the clutch 17 locks up the planetary gear set 15, so that all of its elements rotate together as a unit, and the shafts 11 and 12 are in effect directly connected. The gear set 20 functions the same as in the first and second speeds forward drive, and the torque multiplication between the shafts 11 and 12 is that produced solely by the gear set 20.

The fourth speed forward drive through the transmission is completed by engaging the clutch 19 and disengaging the brake 18, the clutch 17 remaining in engagement. The clutch 17 connects the carrier 33 to the sun gear 29 of the planetary gear set 15 thus locking up this gear set, so that all of its elements rotate as a unit. The shafts 11 and 12 are thus in effect directly connected together. The clutch 19 connects the ring gear 35 of the gear set 15 with the sun gear 56 of the planet gear set 20. The planet carrier 59 is connected through the shaft 12 with the carrier 33, and, therefore, both the sun gear 56 and the planet carrier 59 are connected to elements of the planet gear set 15 which is locked up. Therefore, the planet gear set 20 is similarly locked up, and shafts 12 and 13 are in effect directly connected. The fourth speed forward drive is thus a one-to-one drive between the shafts 11 and 13.

To complete the reverse drive, the clutch 19 and the brake 21 are engaged. The friction clutch 19 couples the ring gear 35 of the planet gear set 15 to the sun gear 56 of the planet gear set 20. The friction brake 21 holds the planet carrier 59 of the planet gear set 20 and the planet carrier 33 of the planet gear set 15 connected together by means of the shaft 12 against rotation, so that the planet carriers of both planet gear sets are the reaction elements of the gear sets. The power flow is through the shaft 11, the sun gear 28, the planet gears 31, the ring gear 35, the clutch 19, the sun gear 56 and the planet gears 57 and 58 to the ring gear 60 and the output shaft 13. The ring gear 35 rotates in the reverse direction at a speed which is reduced to that of the shaft 11, and the ring gear 60 and the output shaft 13 rotates in the same reverse direction at a speed which is reduced to that of the ring gear 35 and the shaft 11.

The planet gear set 15, since it has only the single planet gears 31 between the sun gear 28 and ring gear 35, reverses the drive, so that the ring gear 35 and the sun gear 56 coupled therewith through the clutch 19 rotate in the reverse direction. The planet gear set 20, since it is of the duplex planet gear type having pairs of planet gears 57 and 58 between the sun gear 56 and the ring gear 60, drives the ring gear 60 in the same direction as the sun gear 56 is driven, namely, in the reverse direction, this drive of the ring gear 60 being at reduced speed and increased torque.

The gears in this transmission may be made of such sizes that the ratio steps between the forward speeds are very nearly the same. If the gears are made with the following number of teeth: gear 28—37 teeth, gear 31—17 teeth; gear 35—71 teeth, gear 32—22 teeth, gear 29—26 teeth, gear 56—29 teeth, gears 57 and 58—19 teeth and gear 60—71 teeth, the torque ratios of the various drives, and the ratio steps between the forward drives are as follows:

|  | Torque Ratio | Ratio Steps |
| --- | --- | --- |
| Reverse | −4.69 |  |
| 1st | 4.93 |  |
| 2nd | 2.87 | 1.71 |
| 3rd | 1.69 | 1.70 |
| 4th | 1.00 | 1.69 |

It will be understood that the ratio step between any two successive torque ratios is that particular number which is multiplied by the torque ratio of a higher speed that gives the torque ratio of the next successive lower speed. For example, the torque ration of 2.87 for second speed drive is the product of the torque ratio for third speed drive of 1.69 multiplied by the ratio step of 1.70, the ratio step between second and third speed drives.

If, in lieu of the above gear sizes, the following gear sizes are used: gear 28—34 teeth, gear 31— 20 teeth, gear 35—74 teeth, gear 32—19 teeth, gear 29—29 teeth, and the gears of the planet gear set 20 remain the same, then the following torque rations and ratio steps will be obtained:

|  | Torque Ratio | Ratio Steps |
| --- | --- | --- |
| Reverse | −5.32 |  |
| 1st | 5.36 |  |
| 2nd | 31.3 | 1.71 |
| 3rd | 1.69 | 1.85 |
| 4th | 1.00 | 1.69 |

Figure 3:
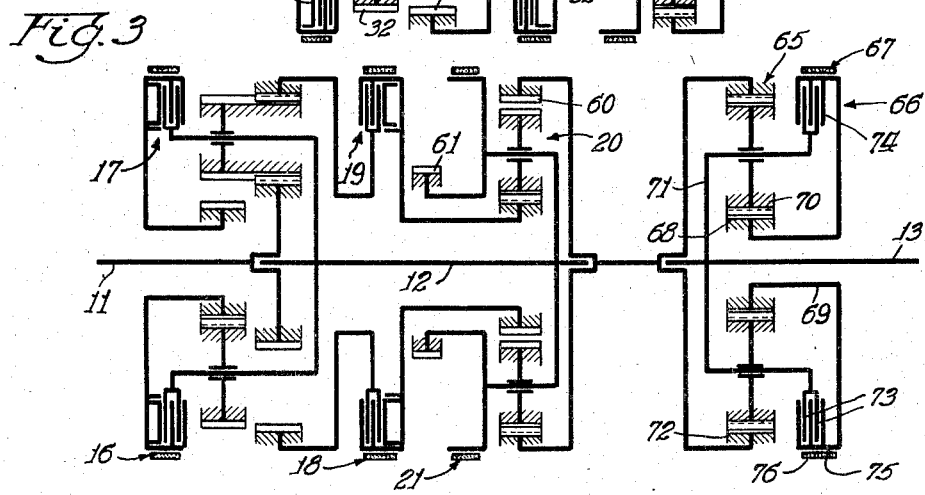
Fig. 3 is a schematic illustration of a transmission similar to those shown in the preceding figures but having an added auxiliary transmission.

Referring now to Figure 3 of the drawings, there is illustrated the basic transmission shown in Figures 1 and 2 with the addition of an auxiliary transmission in series therewith. The auxiliary comprises a planet gear set 65, a friction clutch 66 and a friction brake 67. The planet gear set 65 comprises a sun gear 68 mounted on a sleeve 69 which is concentric to and is relatively rotatable with respect to the output shaft 13, a plurality of planet gears 70 rotatably mounted on a planet carrier 71 and a ring gear 72. The planet gears 70 are in mesh with both the sun gear 68 and also the ring gear 72. In this modification, the ring gear 60 of the gear set 20 is connected to the ring gear 72 instead of directly with the shaft 12, and the shaft 13 is connected to the planet carrier 71.

The friction clutch 66 is generally similar to the friction clutches 17 and 19 of the Figure 1 embodiment and includes a plurality of clutch discs 73 connected to the sleeve 69 and a plurality of interleaved friction plates 74 connected to the planet carrier 71, and the plates and discs are adapted to be packed in frictional engagement by well-known means, such as a fluid pressure operated piston (not shown) as in the Figure 1 embodiment.

The friction brake 67 comprises a brake drum 75 connected to the sleeve 69 and a flexible brake band 76 adapted to be frictionally engaged on the drum 75 by suitable well-known means, such as a fluid operated servomotor (not shown). The brake construction is generally similar to the construction of the friction brakes 16 and 18 of the Figure 1 embodiment.

The addition of the auxiliary transmission to the Figure 1 embodiment provides a transmission with eight forward speed ratios and two different reverse drives, and the power flow through the basic transmission to the ring gear 72 is the same for all forward speeds and also for the reverse drives as in the Figure 1 embodiment.

If the same forward speed and reverse drive ratios as in the Figure 1 embodiment are desired, the friction clutch 66 is engaged in addition to the friction elements mentioned with reference to the operation of the Figure 1 embodiment. The friction clutch 66 couples the planet carrier 71 and the sun gear 68 together, so that the gear set 65 is locked up and its parts are non-rotative with respect to each other, and, therefore, the rotation imparted to the ring gear 72 will be imparted to the output shaft 13.

In order to provide a reduced speed drive corresponding to each of the forward and reverse drives of the Figure 1 embodiment, the friction clutch 66 is disengaged and the friction brake 67 is engaged in addition to the friction elements mentioned for the respective drives of the Figure 1 embodiment. The friction brake 67 holds the sun gear 68 against rotation, so that the sun gear 68 functions as a reaction element for the planet gear set 65. The gear set 65 drives the output shaft 13 at a reduced speed and increased torque with respect to the ring gear 60, the drive being through the ring gear 72, the planet gears 70 and the carrier 71 to the output shaft 13. The Figure 1 embodiment may be designed to provide substantially equal ratio steps between its forward speed ratios, as described, and the auxiliary transmission of Figure 3 may be so designed that the ratios provided with the brake 67 engaged are midway between the ratios provided by the Figure 1 embodiment. Since the Figure 1 embodiment provides four forward speed ratios, the Figure 3 embodiment provides eight forward speed ratios, and the ratio steps between the eight speed ratios with this design of auxiliary transmission will also be approximately equal and of a numerical value of approximately one-half of the ratio steps provided by the Figure 1 embodiment, so that the auxiliary transmission functions as a ratio splitting transmission.

Figure 4:
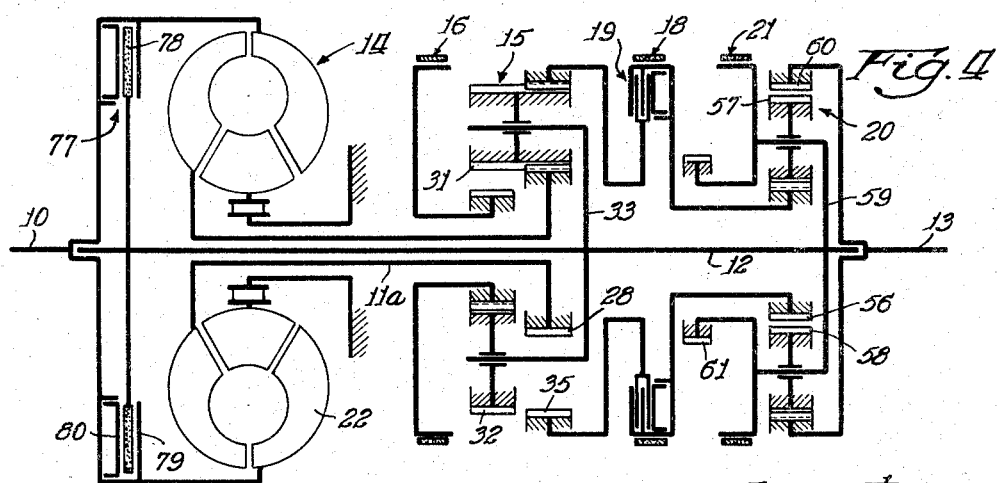
Fig. 4 is a schematic illustration of a modified form of the transmission illustrated in Fig. 1 with a clutch being provided between certain parts of the gearing and the transmission drive shaft for at times by-passing the hydraulic torque converter.

Reference is now made to Figure 4 of the drawings which shows a further modification of the transmission shown in Figure 1. The basic difference between the Figure 4 transmission as compared to the Figure 1 embodiment is that the friction clutch 17 in the Figure 1 embodiment is replaced by a friction clutch 77 for directly connecting the planet gear carrier 33 with the drive shaft 10 and with the sun gear 28 through the torque converter 14 which is generally operating in direct drive when the clutch 77 is in use. This clutch 77 is positioned to by-pass the hydrodynamic device 14 in third speed forward drive and to provide a split path power flow in fourth speed forward drive. For accommodating this change, the shaft 11 is replaced by a sleeve shaft 11a, and the shaft 12 is extended so as to be fixed to a friction plate 78 constituting a part of the friction clutch 77.

The friction clutch 77 is of well-known single plate construction comprising the clutch plate 78 adapted to be packed in frictional engagement between a fixed pressure plate 79 and a fluid pressure operated piston 80. The friction plate 78 is connected to the shaft 12, and the piston 80 and plate 78 are connected to the input shaft 10 and the impeller 22.

The drive through this embodiment of the invention is the same in the first and second forward speed drives and in reverse drive as in the Figure 1 embodiment, with the same friction elements being engaged for each of the drives.

The third speed forward drive is completed by engaging the clutch 77 and the friction brake 18. The friction clutch 77 being engaged, the input shaft 10 is directly coupled to the shaft 12, bypassing the hydraulic torque converter 14. The friction brake 18 holds the sun gear 56 of the planet gear set 20 against rotation, so that the sun gear 56 functions as a reaction element for the planet gear set 20. In this speed drive, the planet gear set 15 is inoperative as a speed reducing element, and all speed reduction is accomplished by the planet gear set 20. The power flow is through the shaft 10, the clutch 77, the shaft 12, the planet carrier 59, the planet gears 57 and 58 to the ring gear 60 and the output shaft 13. The rotation of the output shaft 13 will be the same or substantially the same as for the third speed forward drive in the Figure 1 embodiment, but the drive in the Figure 4 embodiment is exclusive of the hydraulic torque converter 14.

In the fourth speed forward drive for the Figure 4 embodiment, the clutch 77 is engaged and the clutch 19 is engaged. The clutch 77 functions to directly connect the shaft 10 with the shaft 12, while the clutch 19 functions to connect the ring gear 35 of the planet gear set 15 with the sun gear 56 of the planet gear set 20. The power flow for fourth speed is split between the clutch 77 and the torque converter 14 and is recombined in the planet gear sets 15 and 20. One path of power flow is through the shaft 10, the clutch 77, the shaft 12, the planet carrier 33, and the planet gears 31 and 32 to the ring gear 35. The other path of power flow is through the shaft 10, the torque converter 14, the sleeve shaft 11A, the sun gear 28 and the planet gears 31 and 32 to the ring gear 35. Two paths of power flow exist between the planet gear sets 15 and 20, one path being from the ring gear 35 through the clutch 19, the sun gear 56 and the planet gears 57 and 58 to the ring gear 60 and the output shaft 13. The other path is from the carrier 33 through the rear portion of the shaft 12, the planet carrier 59, the planet gears 57 and 58 to the ring gear 60 and the output shaft 13. Neglecting the small slip that ordinarily occurs in the torque converter 14, all of the elements of the planet gear set 15 and all of the elements of the planet gear set 20 rotate as units at the same speed as the shaft 10, a substantial one-to-one drive existing between shafts 10 and 13.

Attention is now directed to Figure 5 of the drawings which illustrates a further modification of the invention utilizing a fluid coupling and providing four forward speed drives. This modification is essentially the same as the transmission of the Figure 1 embodiment, with the exception that the friction clutch 17 of the Figure 1 embodiment is replaced by a friction clutch 81, and the torque converter 14 is replaced by a fluid coupling 82. The friction clutch 81 comprises a plurality of clutch discs 83 and a plurality of interleaved friction discs 84 adapted to be packed in frictional engagement by a suitable conventional fluid pressure operated piston (not shown).

The fluid coupling 82 comprises a fluid impeller 85 and a fluid runner or driven element 86. The impeller 85 is driven from the drive shaft 10 and is connected with the clutch discs 83 through a sleeve shaft 87. The runner 86, like the runner or driven element 23 of the torque converter 14 is connected with the shaft 11. The clutch 81 connects the sun gear 29 with the drive shaft 10 through the impeller 85 of the fluid coupling 82 and with the sun gear 28 through the impeller 85 and runner 86 of the fluid coupling 82 which is generally operating at a substantial one to one drive when the clutch 81 is utilized.

The power trains through the transmission for first and second forward speed drives and reverse drive are the same as in the Figure 1 embodiment, with the same friction elements being engaged. All of the power in each of these drives is transmitted from the drive shaft 10 through the fluid coupling 82 to the intermediate shaft 11, in lieu of such transmission of power through the three element torque converter 14 for which the fluid coupling 82 has been substituted.

To complete the third speed forward drive through the transmission, the friction clutch 81 and the friction brake 18 are engaged. The friction clutch 81 connects the sun gear 29 directly to the drive shaft 10 through the impeller 85, and the friction brake 18 holds the sun gear 56 of the planet gear set 20 against rotation, so that the sun gear 56 functions as a reaction element for the gear set 20. The clutch 81 splits the power flow, one path of power flow being through the impeller 85, the clutch 81, the sun gear 29 and the planet gears 31 and 32 to the planet carrier 33; and the other path of power flow being from the impeller 85, through the runner 86, the shaft 11, the sun gear 28 and the planet gear 31 to the carrier 33. The planet gear set 15 recombines the power flow, and, neglecting the slip in the fluid coupling 82, the parts of the planet gear set 15 rotate as a unit to drive the intermediate shaft 12 substantially at the same speed as the drive shaft 10. The carrier 33 of the gear set 15 drives the shaft 12, and power flows through the planet carrier 59, the planet gears 57 and 58 and the ring gear 60 to the output shaft 13. The sun gear 56 functions as the reaction element of the gear set 20, and, since the gear set 20 is of the duplex planet gear type, the ring gear 60 and output shaft 13 are driven at a reduced speed and increased torque with respect to the shafts 11 and 12.

To complete the fourth speed forward drive through the transmission, the friction clutch 19 is engaged and the friction brake 18 is disengaged, leaving the friction clutch 81 in engagement. The power from the drive shaft 10 splits into two paths, similarly as in third speed drive, with the sun gear 28 being driven through the fluid coupling 82 and the sun gear 29 being driven directly from the drive shaft 10 through the impeller 85. Since both sun gears 28 and 29 are thus driven from the drive shaft 10, the planet gear set 15 is substantially locked up, so that all of its parts rotate as a unit. The power is again split from the planet gear set 15, with one path of power flow being from the carrier 33 through the shaft 12, the carrier 59, the planet gears 57 and 58 and the ring gear 60 to the output shaft 13, and the other path of power flow being from the ring gear 35 through the clutch 19, the sun gear 56, the planet gears 57 and 58 and the ring gear 60 to the output shaft 13. The planet gear set 20 thus recombines the power into a single path, and since the planet gear set 15 is substantially locked up so that its carrier 33 and its ring gear 35 rotate at substantially the same speed, the planet carrier 59 and the sun gear 56 are driven at substantially the same speed to lock up the gear set 20 and drive the sun gear 60 and output shaft 13 at the same speed as the carrier 59 and sun gear 56. Substantially a one-to-one power train thus exists between the shafts 10, 11, 12 and 13.

The transmission illustrated diagrammatically in Fig. 6 of the drawings constitutes a further modification of the transmission illustrated in Fig. 1 and differs principally therefrom in the replacement of the front clutch 17 by a rear clutch 88. The rear clutch 88 is effective on the planetary gear set 20 while, as has been described, the front clutch 17 in the first embodiment is effective on the front planetary gear set 15. The clutch 88 comprises a plurality of clutch disks 89 and a plurality of friction disks 90 interleaved with the disks 89. The disks 89 and 90 are adapted to be packed into frictional engagement by any suitable well-known means, such as by a fluid operated piston (not shown). The clutch 88 is disposed within the brake drum 63, the friction disks 89 being connected to the drum and the friction disks 90 being connected to the sleeve shaft 47.

The reverse drive and the first and second forward drives through the Fig. 6 embodiment of the invention are essentially the same as for the Fig. 1 embodiment, with the same friction elements being engaged for the respective drives.

The third speed forward drive in the Fig. 6 embodiment, like the third speed forward drive in the other embodiments of the invention, is a reduction drive; and the speed reduction in the Fig. 6 embodiment is obtained by means of the planetary gear set 15 instead in the planetary gear set 20 as in the Fig. 1 embodiment. The third speed forward drive in the Fig. 6 embodiment is completed by engaging the clutch 88 and the brake 16. The brake 16 holds the sun gear 29 against rotation, so that the sun gear 29 functions as a reaction element for the planetary gear set 15. The clutch 88 couples the sun gear 56 and the planet gear carrier 59 together, so that the parts of the planetary gear set 20 are non-rotative relative to each other, and the gear set 20 is locked up. The power flows through the shaft 11, the sun gear 28, the planet gears 31 and 32, the planet gear carrier 33, the shaft 12, the planet carrier 59, the planet gears 57 and 58 to the ring gear 60 and the output shaft 13. The ring gear 60 and the shaft 13 rotate in the same direction at a speed reduced with respect to that of the shaft 11, but greater than that in the second speed drive. The planetary gear set 15, since the brake 16 is effective to hold the sun gear 29 against rotation rendering it a reaction element, drives the carrier 33 and the shaft 12 at a speed which is reduced with respect to the speed of the shaft 11, and the shaft 12 in effect is directly connected with the output shaft 13, this direct connection being accomplished by the planetary gear set 20 which is locked up.

Fourth speed forward drive is obtained by engaging the two clutches 88 and 19. The clutch 88 locks up the planetary gear set 20 as has just been described in connection with third speed forward drive. The clutch 19 connects the sun gear 56 of the planetary gear set 20 with the ring gear 35 of the planetary gear set 15, and the carrier 33 of the planetary gear set 15 is permanently connected through the shaft 12 with the carrier 59 of the planetary gear set 20. Since the clutch 88 locks all of the parts of the planetary gear set 20 to rotate as a unit, the planetary gear set 15 is likewise locked up so that all of its parts rotate as a unit, since the ring gear 35 and the planet gear carrier 33 of the gear set 15 are connected to parts of the locked up gear set 20. The drive is from the shaft 11 through the sun gear 28, the planetary gears 31 and 32 to both the ring gear 35 and the planet gear carrier 33, the power splitting in the planetary gear set 15 to the ring gear 35 and the carrier 33. The path of power flow from the ring gear 35 is through the clutch 19 and the shaft 47 to the locked up planetary gear set 20, and the path of power flow from the carrier 33 is through the shaft 12 also to the locked up planetary gear set 20. The power flows from the planetary gear set 20 directly to the output shaft 13, and fourth speed forward drive is a direct drive, since both gear sets 15 and 20 are locked up.

The gears in this embodiment of the transmission may be made of such sizes that the ratio steps between the forward speeds are very nearly the same. If the gears are made with the following number of teeth: gear 28— 37 teeth, gear 31—17 teeth, gear 32—19 teeth, gear 29— 26 teeth, gear 35—71 teeth, gear 56—29 teeth, gears 57 and 58—19 teeth, and gear 60—71 teeth, the torque ratios of the various drives and ratio steps between the forward drives are as follows:

|  | Torque Ratio | Ratio Steps |
|---|---|---|
| Reverse | −4.69 |  |
| 1st | 4.93 |  |
|  |  | 1.71 |
| 2nd | 2.87 |  |
|  |  | 1.69 |
| 3rd | 1.70 |  |
|  |  | 1.70 |
| 4th | 1.00 |  |

My improved transmissions advantageously utilize a minimum number of gears and friction engaging elements considering that they provide at least four speeds in forward drive and a drive in reverse. The changes between successive forward drives are all single transition shifts, that is, simply the disengagement of one friction engaging device and the simultaneous engagement of another friction device are required in order to make a ratio change. Furthermore, all of the ratio changes are from a friction brake to a friction clutch or vice versa— in order to make the change between successive ratios, it is not required that one clutch be disengaged while another is being engaged or that one brake is being engaged while another is being disengaged, and smooth changes between successive ratios are thus obtained.

In my improved transmissions, the friction brakes 18 and 21 take the greatest reaction, and advantageously these brakes are applied statically, that is, these brakes are applied when the transmission is in neutral condition for either completing the low speed forward drive or the reverse drive. The other brake 16 which does not take as great a reaction is engaged dynamically, that is, it is engaged for completing higher forward drive speeds.

Hunting tooth combinations in the gear teeth may be advantageously used with the planetary gear sets in my improved transmission, and wear in the planetary sets is thus minimized. The transmission designs are furthermore simple and rugged. The free clutch and brake spinning speeds, that is, the speeds of the clutch and brake parts when not engaged, are nominal thereby minimizing jerks to the vehicle on changing drives. The speeds of the gears of the planetary gear sets under all conditions are not unduly high, so that gear noise is minimized. The power take-off drive using the gear 61 is advantageously located in the intermediate portion of the transmission with adequate speed for many uses. As will be observed, the power take-off gear 61 is connected with the carrier 33 of the front planetary gear set 15 through the carrier 59 and the shaft 12; so that, whenever the planet gear carrier 33 of the front gear set 15 is driven, as by engagement of the brake 16 or by simultaneous engagement of the brake 18 and clutch 19, the power take-off gear 61 will be driven.

I wish it to be understood that my invention is not to be limited to the specific constructions and arrangements shown and described, except only insofar as the claims may be so limited, as it will be understood to those skilled in the art that changes may be made without departing from the principles of the invention.

I claim:

1. In transmission mechanism, the combination of a drive shaft, a driven shaft, a first planetary gear set driven by said drive shaft, a second planetary gear set driving said driven shaft, each of said gear sets comprising a plurality of driving and drive controlling elements, a first one of said elements of said first gear set being connected to a first one of said elements of said second gear set, a clutch for connecting a second one of said elements of said first gear set with a second one of said elements of said second gear set, a brake for said first elements for completing a power train between said shafts when said clutch is also engaged, means including a clutch for effectively connecting together two elements of said first planetary gear set for completing a power train between said shafts in which the power splits and flows between said first elements and between said second elements respectively when said first-named clutch is also engaged, a brake for said second element of said second gear set for completing a power train between said shafts when it and said first-named clutch are engaged, and a brake for an element of said first planetary gear set for completing a power train between said shafts when it and said second-named brake are both engaged.

2. In transmission mechanism, the combination of a drive shaft, a driven shaft, first and second planetary gear sets, said first gear set comprising a sun gear driven from said drive shaft and a ring gear element and a planet gear in mesh with the sun gear and ring gear element and a planet gear carrier, said second planetary gear set comprising a ring gear driving said driven shaft and a sun gear element and a planet gear in mesh with said last-named ring gear and a planet gear in mesh with said last-named planet gear and with said last-named sun gear element and a planet gear carrier, said planet gear carriers of said two gear sets being connected together, and engaging means including means for interconnecting said elements and a brake effective on at least one of said elements for completing a drive through both of said gear sets for thereby driving said driven shaft from said drive shaft through said gear sets.

3. In transmission mechanism, the combination of a drive shaft, a driven shaft, first and second planetary gear sets, said first gear set comprising a sun gear driven from said drive shaft and a ring gear and a planet gear in mesh with the sun and ring gears and a planet gear carrier, said second planetary gear set comprising a ring gear driving said driven shaft and a sun gear and a planet gear in mesh with said last-named ring gear and a planet gear in mesh with said last-named planet gear and with said last-named sun gear and a planet gear carrier, said planet gear carriers being connected together, clutch means for connecting the ring gear of said first planetary gear set with the sun gear of said second planetary gear set and a brake for one of said two last-named gears for completing a power train between said shafts and through said gear sets when it and said brake are both engaged.

4. In transmission mechanism, the combination of a drive shaft, a driven shaft, first and second planetary gear sets, said first planetary gear set comprising a sun gear driven from said drive shaft and a ring gear and a planet gear in mesh with said sun and ring gears and a planet gear carrier, said second planetary gear set comprising a ring gear driving said driven shaft and a sun gear and a planet gear in mesh with said last-named ring gear and a planet gear in mesh with said last-named planet gear and with said last-named sun gear and a planet gear carrier, said planet gear carriers being connected together, a brake for said planet gear carriers and a clutch for connecting together the ring gear of said first gear set and the sun gear of said second gear set for completing a reverse drive power train between said shafts through said gear sets when said clutch and brake are both engaged.

5. In transmission mechanism, the combination of a drive shaft, a driven shaft, first and second planetary gear sets, said first gear set comprising a sun gear driven from said drive shaft and a ring gear and a planet gear in mesh with said sun and ring gears and a second sun gear and a second planet gear in mesh with said last-named sun gear and with said first-named planet gear and a planet gear carrier, said second planetary gear set comprising a ring gear driving said driven shaft and a sun gear and a planet gear in mesh with said last-named ring gear and a second planet gear in mesh with said last-named planet gear and with said last-named sun gear and a planet gear carrier, means including a clutch for connecting together in driving relationship the carrier and said second-named sun gear of said first planetary set, said planet gear carriers being connected together, and a clutch for connecting together the ring gear of said first planetary set and the sun gear of said second planetary set for completing a substantially one to one drive power train between said shafts when it and said first-named clutch are engaged.

6. In transmission mechanism, the combination of a drive shaft, a driven shaft, first and second planetary gear sets, said first gear set comprising a sun gear driven from said drive shaft and a ring gear and a planet gear in mesh with said sun and ring gears and a second sun gear and a second planet gear in mesh with said last-named sun gear and with said first-named planet gear and a planet gear carrier, said second planetary gear set comprising a ring gear driving said driven shaft and a sun gear and a planet gear in mesh with said last-named ring gear and a second planet gear in mesh with said last-named planet gear and with said last-named sun gear and a planet gear carrier, means including a clutch for connecting together in driving relationship two different elements of one of said planetary sets, said planet gear carriers being connected together, and a clutch for connecting together the ring gear of said first planetary set and the sun gear of said second planetary set for completing a substantially one to one power train between said shafts when both said clutches are engaged.

7. In transmission mechanism, the combination of a drive shaft, a driven shaft, an intermediate shaft, first and second planetary gear sets, said first gear set comprising a sun gear driven from said drive shaft and a ring gear and a planet gear in mesh with said sun and ring gears and a second sun gear and a planet gear in mesh with said first-named planet gear and with said second sun gear and a planet gear carrier, said second planetary set comprising a ring gear driving said intermediate shaft and a sun gear and a planet gear in mesh with said last-named ring gear and a planet gear in mesh with said last-named planet gear and with said last-named sun gear and a planet gear carrier, said planet gear carriers being connected together, a clutch for connecting together the ring gear of said first set with the sun gear of said second set, a brake for said last-named sun gear which when engaged with said clutch completes a first or low speed drive power train between said drive and intermediate shafts, a brake for said second sun gear of said first set which when engaged with said first-named brake completes a second speed power train between said drive and intermediate shafts, a clutch for connecting together the carrier of said first set with the sun gear of said first set which when engaged with said first-named brake completes a third speed drive power train between said drive and intermediate shafts, said clutches when both are engaged completing a direct drive between said drive and intermediate shafts, and an auxiliary gear set connected between said intermediate and driven shafts and comprising a sun gear and a ring gear and a planet gear in mesh with the sun and ring gears and a planet gear carrier, said last-named ring gear being connected with said intermediate shaft and said carrier being connected with said driven shaft, a clutch for connecting together two elements of said auxiliary gear set, and a brake for said last-named gear.

8. In transmission mechanism, the combination of a drive shaft, a driven shaft, first and second planetary gear sets, said first planetary set comprising a sun gear and a ring gear and a planet gear in mesh with said sun and ring gears and a second sun gear and a planet gear in mesh with said second sun gear and with said first-named planet gear and a planet gear carrier, a hydrodynamic coupling device for connecting said first-named sun gear with said drive shaft, a clutch for connecting said carrier with said drive shaft, said second planetary set comprising a ring gear driving said driven shaft and a sun gear and a planet gear in mesh with said last-named ring gear and a second planet gear in mesh with said last-named planet gear and with said last-named sun gear and a planet gear carrier, said planet carriers of said gear sets being connected together, a brake for the sun gear of said second set and a clutch for connecting together the ring gear of said first set with the sun gear of said second set for completing a low speed drive between said shafts when the clutch and brake are engaged, and a brake for said second sun gear of said first set for completing a second speed drive between said shafts when the brake is engaged along with said first-named brake, said first-named clutch and said first-named brake when they are engaged completing a third speed drive power train between said shafts exclusive of said hydrodynamic device and said two clutches when they are engaged completing a high speed drive power train between said shafts in which the power from said drive shaft divides between said hydrodynamic device and said first-named clutch.

9. In transmission mechanism, the combination of a drive shaft, a driven shaft, first and second planetary gear sets, said first planetary set comprising a sun gear and a ring gear and a planet gear in mesh with said sun and ring gears and a second sun gear and a second planet gear in mesh with said second sun gear and with said first-named planet gear and a planet gear carrier, a hydrodynamic device for connecting said first-named sun gear with said drive shaft, said second planetary set comprising a ring gear driving said driven shaft and a sun gear and a planet gear in mesh with said last-named ring gear and a second planet gear in mesh with said last-named planet gear and with said last-named sun gear and a planet gear carrier, said carriers of said two sets being connected together, a brake for the sun gear of said second set and a clutch for connecting the ring gear of said first set with the sun gear of said second set for completing a low speed drive between said shafts, a brake for said second sun gear of said first set for completing a second speed drive between said shafts when it and said first-named brake are engaged, and a clutch for connecting said second sun gear of said first set with said drive shaft and operative when the clutch and said first-named brake are engaged for completing a third speed drive between said shafts in which the power from said drive shaft divides with part flowing through said last-named clutch and part through said hydrodynamic device, said two clutches when both are engaged each completing a high speed power train between said shafts in which the power from said drive shaft divides similarly as in third speed drive.

10. In transmission mechanism, the combination of a drive shaft, a driven shaft, first and second planetary gear sets, said first gear set comprising a sun gear driven from said drive shaft and a ring gear and a planet gear in mesh with said sun and ring gears and a second sun gear and a planet gear in mesh with said second sun gear and with said first-named sun gear and a planet gear carrier, said second planetary gear set comprising a ring gear connected to drive said driven shaft and a sun gear and a planet gear in mesh with said last-named ring gear and a planet gear in mesh with said last-named planet gear and with said last-named sun gear and a planet gear carrier, said carriers being connected together, a brake for the sun gear of said second set and a clutch for connecting together the ring gear of said first set and the sun gear of said second set which when both brake and clutch are engaged complete a low speed power train between said shafts, a brake for said second sun gear of said first set which when engaged along with said first-named brake complete a second speed power train between said shafts, a clutch for connecting together two elements of said second planetary gear set for completing a third speed power train between said shafts when it and said second-named brake are engaged, said clutches when both are engaged completing a high speed power train between said shafts.

References Cited in the file of this patent

UNITED STATES PATENTS

| | | |
|---|---|---|
| 2,454,014 | Seybold | Nov. 16, 1948 |
| 2,584,468 | Kelbel | Feb. 5, 1952 |
| 2,612,792 | Wilson | Oct. 7, 1952 |
| 2,693,260 | Lucia | Nov. 2, 1954 |
| 2,762,237 | Kelbel | Sept. 11, 1956 |

FOREIGN PATENTS

| | | |
|---|---|---|
| 658,964 | Great Britain | Oct. 17, 1951 |

UNITED STATES PATENT OFFICE
CERTIFICATE OF CORRECTION

May 19, 1959

Patent No. 2,886,983

James A. Miller

It is hereby certified that error appears in the printed specification of the above numbered patent requiring correction and that the said Letters Patent should read as corrected below.

Column 2, line 55, for "places" read -- plates --; column 4, line 10, for "producting" read -- producing --; column 5, second table, second column thereof, third item, for "31.3" read -- 3.13 --.

Signed and sealed this 6th day of October 1959.

(SEAL)
Attest:

KARL H. AXLINE
Attesting Officer

ROBERT C. WATSON
Commissioner of Patents